(12) United States Patent
Schibuk et al.

(10) Patent No.: US 11,902,249 B2
(45) Date of Patent: Feb. 13, 2024

(54) DEVICE FOR VALIDATING A MESSAGE CONVEYED VIA A NETWORK

(71) Applicant: Seraph Security, Inc., Waltham, MA (US)

(72) Inventors: Norman Schibuk, Merrick, NY (US); Boris Lukashev, Canton, MA (US); Steve Graham, Coquitlam (CA)

(73) Assignee: Seraph Security, Inc., Waltham, MA (US)

( * ) Notice: Subject to any disclaimer, the term of this patent is extended or adjusted under 35 U.S.C. 154(b) by 313 days.

(21) Appl. No.: 17/219,939

(22) Filed: Apr. 1, 2021

(65) Prior Publication Data

US 2021/0243161 A1    Aug. 5, 2021

Related U.S. Application Data

(63) Continuation of application No. 17/130,693, filed on Dec. 22, 2020, now Pat. No. 10,999,250, which is a continuation-in-part of application No. 16/504,614, filed on Jul. 8, 2019, now abandoned, which is a continuation of application No. 15/678,590, filed on Aug. 16, 2017, now abandoned.

(60) Provisional application No. 62/375,948, filed on Aug. 17, 2016.

(51) Int. Cl.
*H04L 9/40* (2022.01)
*H04L 9/32* (2006.01)

(52) U.S. Cl.
CPC ........ *H04L 63/0245* (2013.01); *H04L 9/3236* (2013.01); *H04L 63/0236* (2013.01); *H04L 63/123* (2013.01); *H04L 63/145* (2013.01); *H04L 63/1416* (2013.01)

(58) Field of Classification Search
CPC .................................................. H04L 63/0245
See application file for complete search history.

(56) References Cited

U.S. PATENT DOCUMENTS

| | | | |
|---|---|---|---|
| 7,139,820 B1 * | 11/2006 | O'Toole, Jr. | .......... H04L 63/123 |
| | | | 701/472 |
| 10,116,450 B1 | 10/2018 | Brown et al. | |
| 2007/0116462 A1 | 5/2007 | Peloso et al. | |
| 2008/0244739 A1 | 10/2008 | Liu | |
| 2014/0036936 A1 | 2/2014 | Bui et al. | |
| 2014/0108817 A1 * | 4/2014 | Chen | ....................... G06F 21/64 |
| | | | 713/189 |
| 2018/0054417 A1 | 2/2018 | Schibuk | |

* cited by examiner

*Primary Examiner* — Simon P Kanaan

(74) *Attorney, Agent, or Firm* — Sheehan Phinney Bass & Green PA

(57) ABSTRACT

A validation device in a communication network is configured to communicate control information bidirectionally via a control plane of the network and access message data via a production plane of the network. The validation device receives key data via the control plane, and accesses a message received via the production plane by a message receiving device. The message includes a signature derived from the first key data. The validation device uses the first key data to check validity of the signature.

12 Claims, 11 Drawing Sheets

DEVICE FOR VALIDATING A MESSAGE CONVEYED VIA A NETWORK

CROSS-REFERENCE TO RELATED APPLICATION(S)

This application is a continuation of US patent application Ser. No. 17/130,693, entitled "System and Method for Validating A Message Conveyed Via A Network" filed Dec. 22, 2020, which is a continuation-in-part of U.S. patent application Ser. No. 16/504,614, entitled Packet Tracking, which was filed on Jul. 8, 2019, which claims the benefit of continuation of U.S. patent application Ser. No. 15/678,590, entitled Packet Tracking, which was filed on Aug. 16, 2017, which claims the benefit of U.S. provisional patent application Ser. No. 62/375,948, entitled Packet Provenance—Full Path Disclosure, which was filed on Aug. 17, 2016. The subject matter of the prior applications is being incorporated herein by reference in their entireties.

FIELD OF THE INVENTION

This disclosure relates to data security in a communication network and, more particularly, relates to validation of a data received through a messaging network.

BACKGROUND

Source path validation in packet networks may rely on a destination trusting the contents of the frames and packets received which are susceptible to modification by any entity with access to the traffic in a prior segment. As a result, digital security response personnel and systems must review traffic logs consisting of hundreds of millions records with varying levels of detail to determine actual origin and validity.

The disproportionate computational and analytical burden put on the responders provides attackers with significant advantage when attempting to evade detection.

SUMMARY OF THE INVENTION

In one aspect, a validation device in a communication network is configured to communicate control information bidirectionally via a control plane of the network and access message data via a production plane of the network. The validation device receives key data via the control plane, and accesses a message received via the production plane by a message receiving device. The message includes a signature derived from the first key data. The validation device uses the first key data to check validity of the signature.

In a typical implementation, the validity of the packet is checked by the validator at or near the message destination. Checking the validity of the packet may, in some implementations, include checking, with the computer-based validator, the set of binary signatures attached to the packet to confirm that the string of signatures match what the packet-switched network would have produced had the packet traversed the packet-switched network along a valid path from the source to the destination.

Typically, if the packet passes the validity check, the network allows the packet to be used at the destination. However, if the packet fails the validity check, the network may discard the packet or otherwise handle the packet in a manner consistent with the packet being considered, in some way, malicious or problematic.

In another aspect, a packet-switched network includes at least a first network component, a second network component, and a plurality of switches, where the first network component is coupled to the second network component via the plurality of switches. The first network component (e.g., the packet source) is configured to (and does) transmit a packet across the packet-switched network to the second network component via the plurality of switches. Each respective one of the plurality of switches may attach a unique signature to the packet. Each unique signature identifies a corresponding one of the switches, through which the packet passes as it travels from the source toward a destination. The second network component (e.g., the packet destination) is configured to (and does) receive the packet and an attached string of signatures from the plurality of switches, at or near the destination in the packet-switched network.

In some implementations, the packet-switched network also includes a validator at, or associated with, the destination, and the validator is configured to check the validity of the packet at or near the destination.

More particularly, in a typical implementation, the computer-based validator is further configured to check the validity of the packet at or near the destination by checking the string of signatures attached to the packet to confirm that the string of signatures match what the packet-switched network would have produced had the packet traversed the packet-switched network along a valid path from the source to the destination.

Typically, if the packet passes the validity check, the validator allows the packet to be used at the destination. However, if the packet fails the validity check, the validator discards the packet or otherwise handles the packet in a manner consistent with the packet being considered, in some way, malicious or problematic.

In some implementations, one or more of the following advantages are present.

For example, a packet-switched network may be provided that blocks malicious, or otherwise harmful packets, from reaching a destination in a network. Instead, in some implementations, the suspect packet is discarded.

Moreover, a packet's path from source to destination in a network can be traced, and information representing that path can be stored. So that, if, for example, a malicious or otherwise harmful packet reaches a destination, the source of that packet and various locations of that packet through the network can be easily identified for purposes of taking corrective measures.

The string of signatures attached to the payload of the packet can be used to validate that the contents of the packet have not been altered between the source and destination of the network. In this regard, any layers or portions of a particular packet that have been signed can be checked to confirm that the associated packet contents have not been altered, for example, from the source and the destination.

The validators can be configured or instructed to not accept packets from a source that may have been determined to violate packet integrity (e.g., that the source is risky). In various implementations, this determination may be made by the validator disclosed herein (e.g., by a packet from the source failing validation), or by other threat, intrusion, or malware detection systems that might inform the validator that a particular source (e.g., identified by an IP address) is risky. If a packet arriving from a risky source arrives at a particular destination, the associated validator may reject that packet or otherwise handle the packet in manner consistent with the packet being considered malicious or otherwise harmful.

Other features and advantages will be apparent from the description and drawings, and from the claims.

BRIEF DESCRIPTION OF THE DRAWINGS

Like reference numerals refer to like elements.

DETAILED DESCRIPTION

Figure 1:
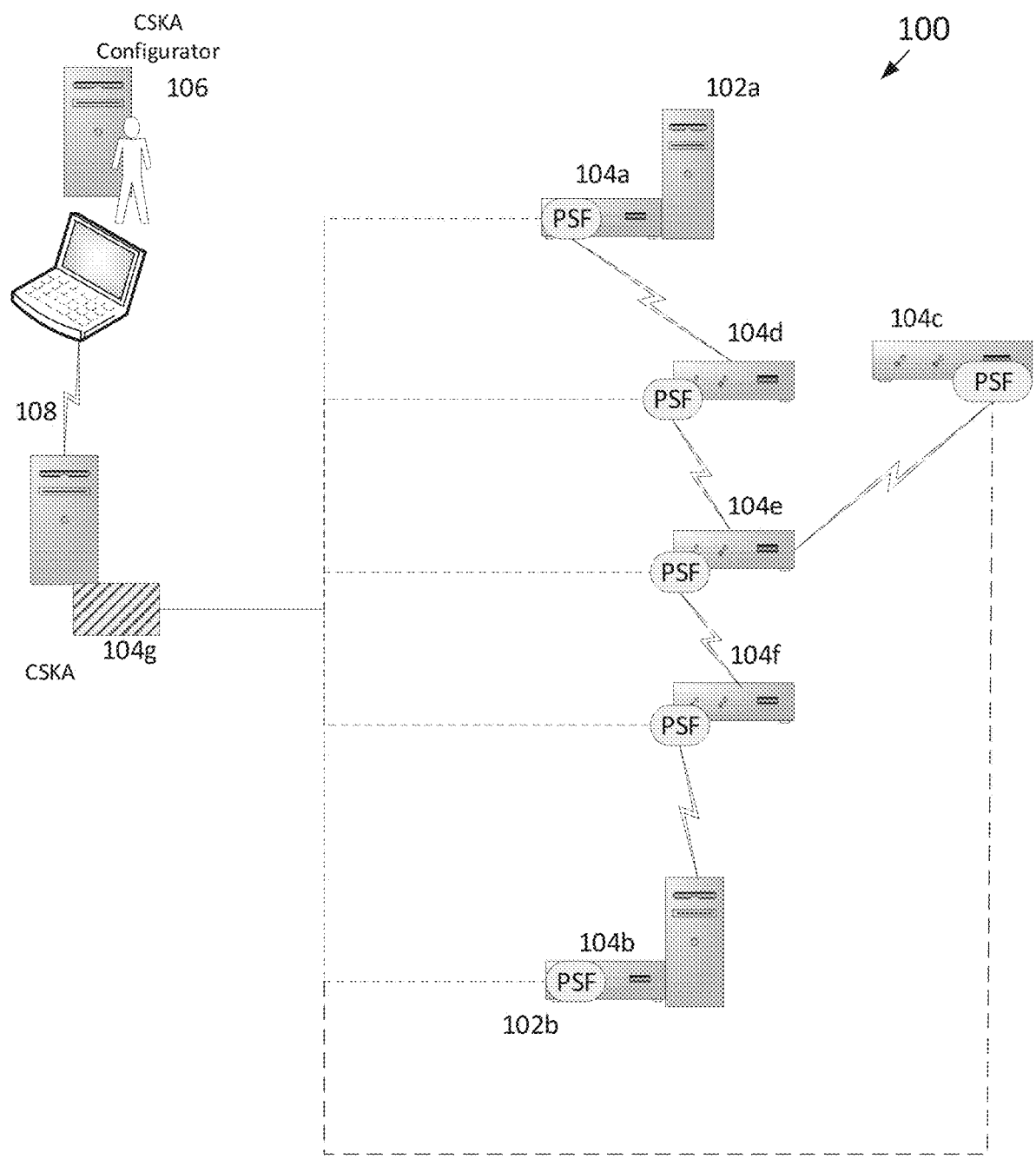
FIG. 1 is a schematic representation of an exemplary computer network that includes a plurality of network components that are able to communicate with each other over a plurality of network communication links.

The following definitions are useful for interpreting terms applied to features of the embodiments disclosed herein, and are meant to define elements within the disclosure.

As used within this disclosure, a "communication network" or "network" refers to a wired or wireless messaging system. While the embodiments below are generally described in the context of a packet switched communication network using an IP message protocol for purposes of illustration, the embodiments of the present invention are not limited to this context, and are applicable to any messaging system and messaging protocol where transmitted messages are accompanied by metadata describing the message payload.

As used within this disclosure, a "tri-parte contract" refers to a secure agreement between three distinct entities (or groups of entities) establishing that each of the entities is a trusted communication partner in a communication network. The entities include one or more signers (switches transmitting a data packet), one or more validators (switches directly or indirectly receiving a data packet from a signer), and typically a single key manager (channel signing key authority (CSKA)).

As used within this disclosure, the "control plane" and the "production plane" refer to independent functional and communication layers between members of the tri-parte contract. All entities in the tri-parte contract bidirectionally communicate control plane information, for example regarding granting and/or revoking cryptographic keys. Similarly, some entities communicate uni-directionally in the production plane. In particular, signers transmit packets unidirectionally to validators. The CSKA is not involved in the production process, and may be regarded as a key broker, assigned to distribute and withdraw keys from signers/validators.

Reference will now be made in detail to embodiments of the present invention, examples of which are illustrated in the accompanying drawings. Wherever possible, the same reference numbers are used in the drawings and the description to refer to the same or like parts.

FIG. 1 is a schematic representation of an exemplary computer network 100 that includes a plurality of network components that are able to communicate with each other over a plurality of network communication links.

The components in the illustrated network 100 include a first network host 102a, a second network host 102b, a user access terminal 106, and a key manager 108. The key manager 108 may also be referred to herein as a channel signing key authority (CSKA) 108. The components 102a, 102b, and 106 communicate with one another via any streaming protocol, for example, but not limited to via packet switching, over the intervening network communication links. To facilitate network communications, the first and second network hosts 102a, 102b have network interface controller (NIC) switches 104a, 104b, which are integral computer hardware components that connect the hosts into the computer network 100. The user access terminal 106 is connected to a network access switch 104c, which is a physically separate hardware component that connects the user access terminal 106 into the computer network 100. There are also three other network switches 104d, 104e, 104f that facilitate and enable communications across the network (e.g., between the first network host 102a, the second network host 102b, and/or the user access terminal 106).

During network operation, any one of components 102a, 102b, or 106 can, at any given time, act as either a packet sender (sending a packet to another component in the network 100), or a packet destination (receiving a packet from another component in the network 100). Typically, in fact, during network operations, each component may, at one point or another, send and receive many different packets.

As the packets make their way through the network 100, each switch (e.g., 104a, 104b, 104c, 104d, 104e, and/or 104f) that the packet passes through performs a packet stamping function on the packet. Every switch along the packet's path in this example is able to, and does, perform a packet-stamping function on the packet. However, this is not necessarily required. In various implementations, certain switches in a particular network may not be able to perform, or simply may not perform, a packet-stamping function on packets that pass through the switches. Indeed, in some implementations, a network may have very few—even as little as one—switch that is able to, or that does, stamp packets passing through. The packet stamping function causes a signature (e.g., a unique data string related to the identity of the switch and/or the contents of the packet) to be attached to the packet. In a typical implementation, the signature can be used to validate that the contents of the packet have not been altered, and can be used to identify the switch (or associated component), through which the packet passed, and that attached the signature to the packet. If a particular packet travels through multiple switches, that packet may receive multiple different signatures.

In a typical implementation, each packet is validated at its destination. Packet validation generally refers to a process whereby a packet's one or more signatures are checked (e.g., by a validator at or associated with a packet's destination) to confirm that the signature (or string of signatures) attached to the packet matches what the network would have produced had the packet traversed the network 100 along an available and valid path. A valid path is any actual path through the network 100 from a source to a destination that does not alter contents of the packet that have been used to generate the signatures.

If a packet fails a validation attempt, that packet may be discarded or otherwise handled in a manner consistent with the notion that the packet may be, in some way, malicious or otherwise problematic.

Moreover, in a typical implementation, information about each packet's path through the network 100 may be stored and preserved (e.g., in a memory storage device) for some period of time so that if a particular packet is determined to have been in some way malicious, its path through the network can be analyzed easily to efficiently identify the source of the packet as well as any other possible locations in the network where packet corruption may have occurred.

In various implementations, one or more of the following advantages may be present. In some implementations, for example, the techniques and technologies disclosed herein may help to validate packets when they arrive at a destination in the network 100. Additionally, in some implementations, the techniques and technologies disclosed herein may help to block packets from reaching or being used at a destination if the packets are not properly validated first. Moreover, in some implementations, the techniques and technologies disclosed herein may help facilitate tracing the path of a packet through the network 100 from a source to a destination. Furthermore, in some implementations, the techniques and technologies disclosed herein may help to ensure that only packets that should reach a particular network destination actually do reach that destination. Even further, in some implementations, the techniques and technologies disclosed herein may help to ensure that any packets that are not properly validated at a destination are discarded or otherwise handled in a manner consistent with the notion that the packet may be, in some way, malicious or otherwise problematic. Moreover, in some implementations, the techniques and technologies disclosed herein may facilitate identifying the source of a packet and any other possible locations in the network that a packet passed through and, therefore, may have been corrupted after it is determined that a packet is in some way malicious. Accordingly, in a typical implementation, the techniques and technologies disclosed herein can provide significant advances in the operation of packet switched networks.

There may be many ways that the network 100 could generate the signatures that get attached to the packets that traverse the network 100. Likewise, there may be many possible ways that the network 100 could check the signature(s) at a packet destination. In one such example, such as the one represented in FIG. 1, the network 100 has a CSKA 108 that is connected to (via NIC switch 104g) and interacts with the packet-switching functionality (PSF)-enabled switches 104a, 104b, 104c, 104d, 104e, and 104f in the network 100. More particularly, in this regard, the CSKA 108 may interact with any switch in the network 100 that is charged with, or involved in, sending, or forwarding a packet to a destination to create a signature for that switch to attach to the packet. Additionally, in this regard, the CSKA 108 may interact with any switch or other component in the network charged with validating a received packet to help the switch or other component to validate the packet.

In a typical implementation, a single network (e.g., network 100) will have a single CSKA 108 that interacts with all of the components (e.g., switches) in the network 100 that require such interactions.

In a typical implementation, the packet stamping and validation functionalities are performed in a manner that, at no point in time, does a single system component have all of the information available to perform and/or facilitate packet stamping and validation. This helps make the techniques and network validation disclosed herein fairly resistant to hacking.

There are several possible paths through the network 100 that a packet may travel. For each path that a packet travels through the network 100, the packet will pass through one or more network components that may be PSF enabled. Only network switches that are PSF enabled will be included in packet traces.

For example, a packet originated at the first network host 102a and intended to reach the second network host 102b may traverse the network 100 on a path that includes NIC switch 104a, network switch 104d, network switch 104e, network switch 104f, network switch 104b, and the intervening network communication links. Conversely, a packet originated at the second network host 102b and intended to reach the first network host 102a may traverse the network 100 on a path that includes NIC switch 104b, network switch 104f, network switch 104e, network switch 104d, NIC switch 104a, and the intervening network communication links.

Likewise, in the illustrated network 100, a packet originated at the first network host 102a and intended to reach the user access terminal 106 may traverse the network 100 on a path that includes NIC switch 104a, network switch 104d, network switch 104e, access switch 104c, and the intervening network communication links. Conversely, a packet originated at the user access terminal 106 and intended to reach the first network host 102a may traverse the network 100 on a path that includes access switch 104c, network switch 104e, network switch 104d, NIC switch 104a, and the intervening network communication links.

Likewise, in the illustrated network 100, a packet originated at the user access terminal 106 and intended to reach the second network host 102b may traverse the network 100 on a path that includes access switch 104c, network switch 104e, network switch 104f, NIC switch 104b, and the intervening network communication links. Conversely, a packet originated at the second network host 102b and intended to reach the user access terminal 106 may traverse the network 100 on a path that includes NIC switch 104b, network switch 104f, network switch 104e, access switch 104c, and the intervening network communication links.

Since all of these switches 104a, 104b, 104c, 104d, 104e, are 104f in the exemplary network 100 are PSF-enabled (not all switches need to be PSF-enabled), regardless of the specific path that a packet might take through the network 100 from one source to a destination, the packet will receive a signature from every one of these switches it comes in contact with (e.g., passes through).

Figure 2:
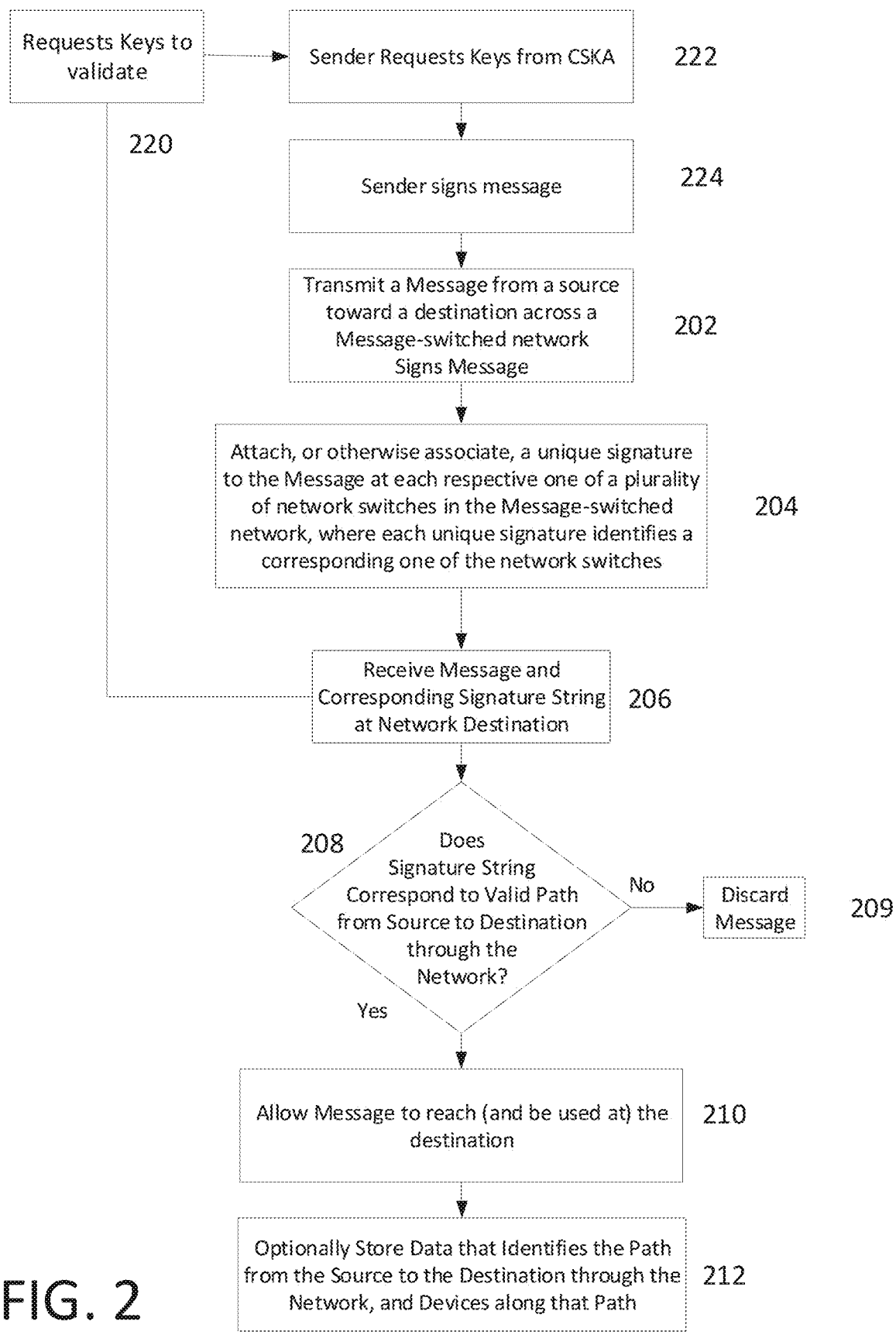
FIG. 2 is a flowchart of an exemplary packet tracing process that may be performed by the network in FIG. 1.

FIG. 2 is a flowchart of an exemplary process that may be performed by the network 100 in FIG. 1.

The process represented by the illustrated flowchart includes the sender (a packet source (e.g., network host 102*a*)) requesting keys from the CSKA, as shown by block 224. The sender signs a message, as shown by block 224.

The sender transmits a packet (at 202) across the packet-switched network 100 to a packet destination (e.g., network host 102*b*).

Next, according to the represented process, (at 204) each respective one of the switches in the packet-switched network 100 attaches a unique signature to the packet, as the packet passes through that switch. Again, in some implementations, less than all of the switches along a particular packet's path may attach a unique signature to a passing packet. Each unique signature identifies the corresponding switches, through which the packet passes as it travels from the source toward a destination, and the fact that the signature becomes attached to a particular switch indicates that the packet at issue has passed through the associated switch during its traversal of the packet-switched network 100 from the source to the destination. In a typical implementation, the signatures are produced at each switch in collaboration with a computer-based network CSKA 108.

Next, according to the represented process, (at 206) the network destination (e.g., network host 102*b*), or a component (e.g., switch) near the network destination, receives the packet and any attached string of signatures from any switches that the packet may have passed through during its network traversal.

Next, according to the represented process, a computer-based validator associated with the packet destination (e.g., at, near, or in communications with the packet destination) performs a validity check of the packet. According to the represented process, checking the validity of the packet includes determining (at 208), with the computer-based validator, whether the string of signatures attached to the packet corresponds to (e.g., matches) what the packet-switched network 100 would have produced had the packet traversed the packet-switched network 100 along a valid path from the source to the destination.

In some implementations, determining whether a string of signatures corresponds to what the packet-switched network 100 would have produced had the packet traversed the packet-switched network 100 along a valid path from the source to the destination, involves the computer-based validator accessing any materials needed to produce each of the signatures along the packet's path through the network 100, and essentially reproducing what each of the signatures should be—if the packet had traversed a valid path through the network 100. In various implementations, the computer-based validator may, in this regard, obtain the material needed to do this from the various switches involved in the packet's traversal, from the CSKA 108, or from both.

If (at 208) the packet passes the validity check (e.g., if the computer-based validator determines that the string of signatures attached to the packet corresponds to (e.g., matches) what the packet-switched network 100 would have produced had the packet traversed the packet-switched network 100 along a valid path from the source to the destination), then the computer-based validator (at 210) allows the packet to reach (and be used at) the destination (e.g., at network host 102*b*).

If (at 208) the packet fails the validity check (e.g., if the computer-based validator determines that the string of signatures attached to the packet does not correspond to (e.g., does not match) what the packet-switched network 100 would have produced had the packet traversed the packet-switched network 100 along a valid path from the source to the destination), then the computer-based validator (at 209) discards the packet or otherwise handles the packet in a manner consistent with the packet being considered, in some way, malicious or problematic. In some implementations, this may include, for example, alerting a system administrator and/or one or more system users that a problem might exist in the network.

Next, according to the represented process, (at 212) the network stores, for some period of time, data that represents the packet's path through the network from the source to the destination as represented by the string of signatures associated with the packet. In some implementations, this information may include the string of signatures itself, which may be stored alone or in association with the packet itself. In some implementations, the information may be indicative of the path traversed, but not include the actual signature string itself.

Next, according to the represented process, (at 214), the network (or a system administrator, for example), becomes aware (or determines), after the packet has passed the validity check and been used at the destination, that the packet was, in some way, malicious or problematic to the network 100. The system administrator (or network), at that point (216), reviews the stored data to identify the source of the packet and/or any one or more components/switches in the network 100, through which the packet may have passed when travelling across the network 100 from the source to the destination, based on the string of signatures. Clearly, access to this type of information, and the focused review that access to this type of information can enable, facilitates highly efficient identification and implementation of remedies (at 218) in the network 100—to fix any problems that may have been created by virtue of the malicious or faulty packet traversing the network 100 and/or gaining access to the network destination.

As mentioned elsewhere herein, in a typical implementation, the CSKA 108 and/or packet stamping functions may change the material used to generate and/or validate the signatures at set intervals or in response to a demand by a user. The set intervals may be set by a user.

Figure 3A:
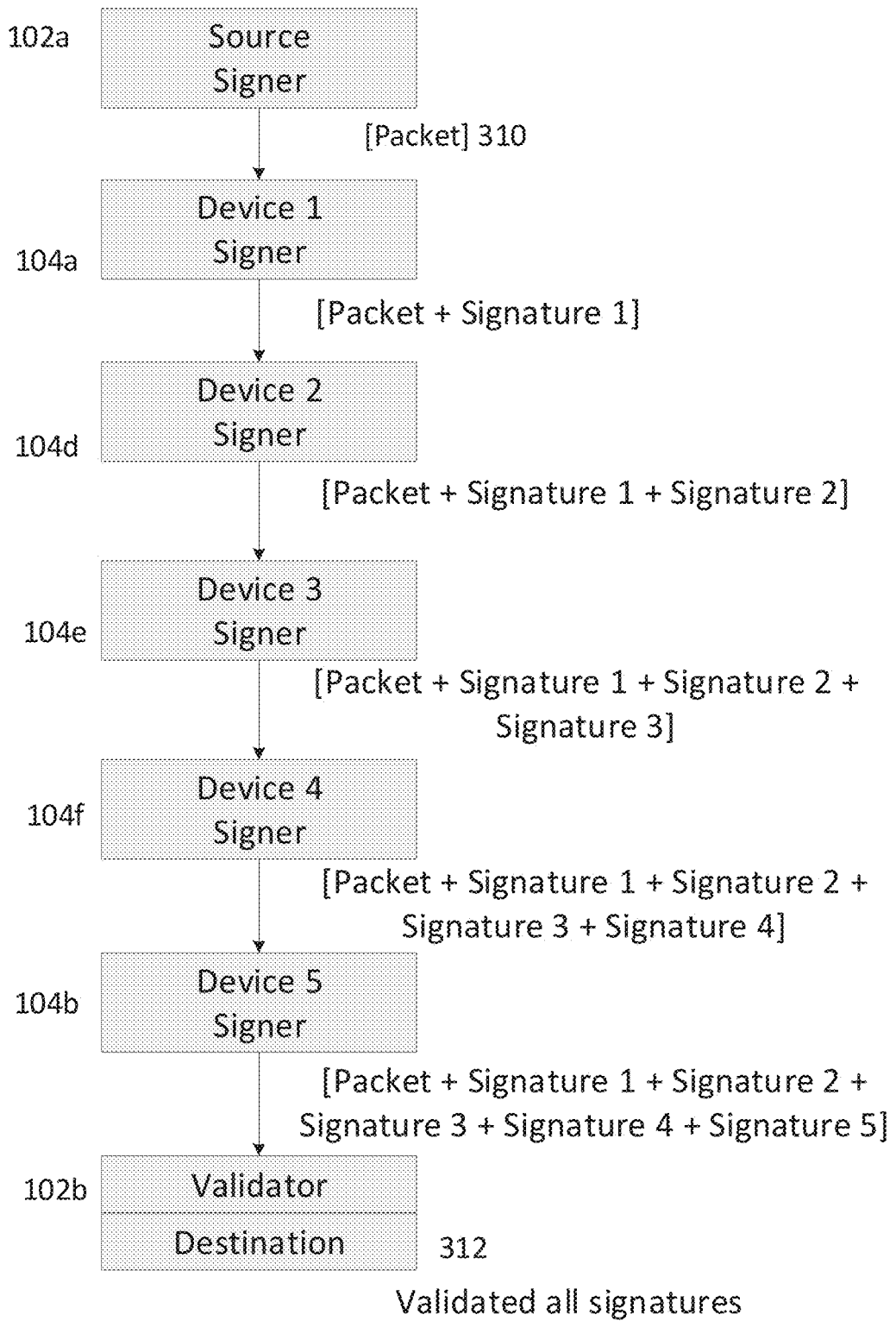
FIG. 3A is an exemplary schematic representation showing one packet traversing the network of FIG. 1 from a source to a destination, with a unique signature being attached to the packet, at one or more switches in the network that the packet passes through as it moves through the network.

FIG. 3A is an exemplary schematic representation showing one packet 310 traversing the network 100 of FIG. 1 from a source (e.g., first network host 102*a*) to a destination (e.g., second network host 102*b*), with a unique signature optionally being attached to the packet, at each switch in the network 100 that the packet passes through as it moves through the network 100. Each signature uniquely identifies its associated switch. Moreover, in a typical implementation, each signature is created by the associated switch in collaboration with the CSKA 108 (e.g., 108 in FIG. 1).

According to the illustrated implementation, the packet is originated at a packet source (e.g., first network host 102*a*). For example, at device 1 (e.g., NIC switch 104*a*), signature 1, which identifies device 1, is attached to the packet 310. At device 2 (e.g., switch 104*d*), signature 2, which identifies device 2, is attached to the packet 310. At device 3 (e.g., switch 104*e*), signature 3, which identifies device 3, is attached to the packet 310. At device 4 (e.g., switch 104*f*), signature 4, which identifies device 4, is attached to the packet 310. Finally, at device 5 (e.g., switch 104*b*), signature 5, which identifies device 5, is attached to the packet 310.

Thus, when the packet 310 arrives at its destination (e.g., network host 102*b*), the string of signatures (including, e.g., signature 1, signature 2, signature 3, signature 4, and signature 5) is attached the packet 310. Since signature 1 corresponds to device 1 (NIC switch 104a), signature 2 corresponds to device 2 (switch 104d), signature 3 corresponds to device 3 (switch 104e), signature 4 corresponds to device 4 (switch 104f), and signature 5 corresponds to device 5 (switch 104b), this signature string identifies, at the packet destination (network host 104b), the packet's 310 precise path through the network 100—namely, that, in this example, packet 310 traveled across the network 100 through device 1 (NIC switch 104a), device 2 (switch 104d), device 3 (switch 104e), device 4 (switch 104f), and device 5 (switch 104b).

Figure 3B:
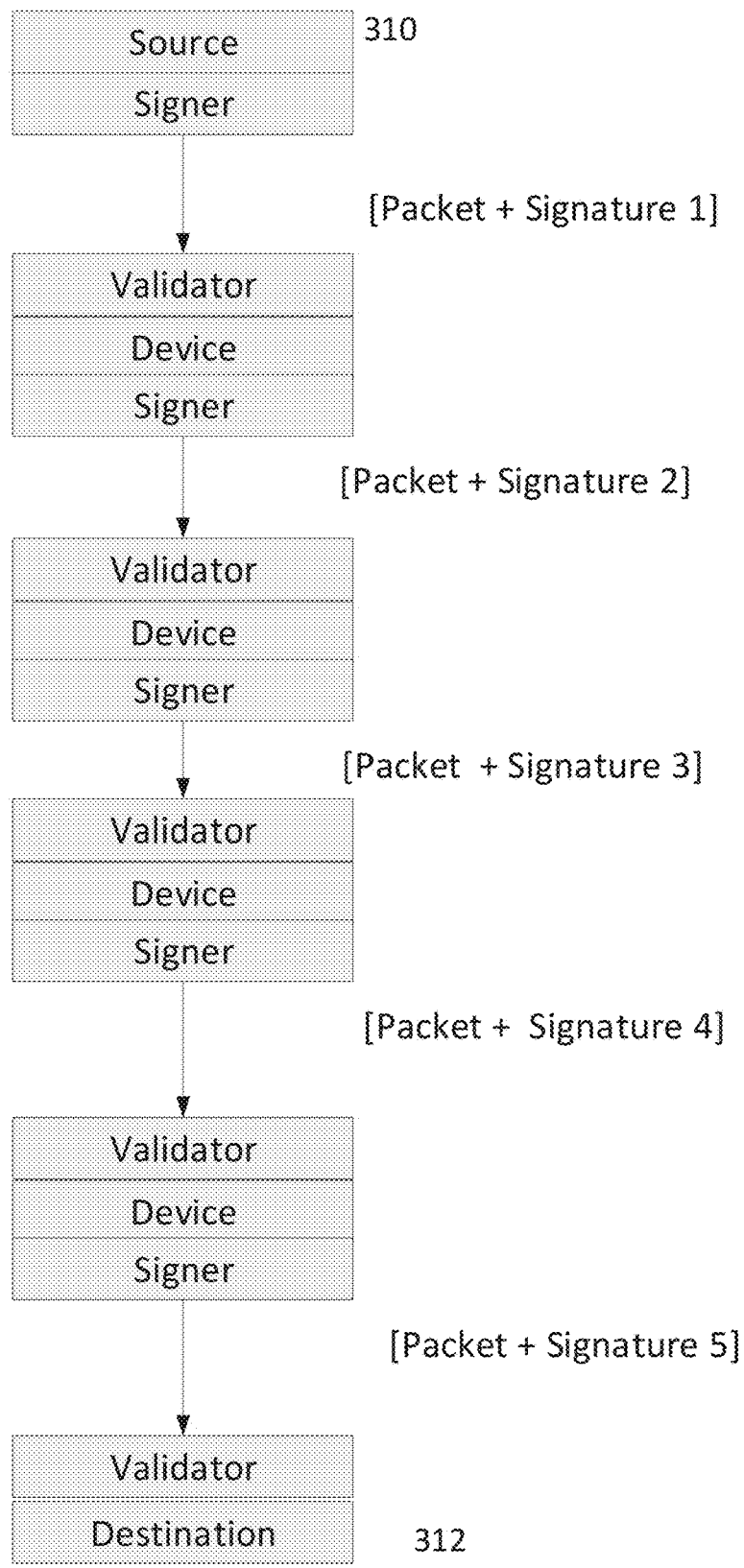
FIG. 3B is a schematic diagram showing a packet traversing the network of FIG. 1 where at each intermediate network node a received signature is stripped and replaced by a new signature for transmitting.

FIG. 3B is a schematic diagram showing a packet traversing the network of FIG. 1 where at each intermediate network node a received signature is stripped and replaced by a new signature for transmitting.

Of course, as mentioned elsewhere herein, the addition of signatures at every device is not necessarily required. In some implementations, a packet may pass through one or more switches along its path through a network without any signature being added. Generally speaking, if fewer signatures are added to a particular packet as it makes its way across a network, visibility and granularity into the packet's specific path are lowered, for example, for packet tracing purposes.

This information about the packet's exact path through the network 100, as represented by the packet's signature string, can be used by a validator 312 at the destination (network host 102b), for example, to check that the path through the network represented by the string of signatures is a valid path through the network 100 (e.g., from the packet's supposed source to the destination). In a typical implementation, if the validity check is successful, then the packet 310 is allowed to be used at the destination (i.e., the network host 102b). However, if the validity check fails, then the packet 310 may be discarded or otherwise handled in a manner consistent with the notion that the packet may be, in some way, malicious or otherwise problematic.

The validation process typically involves determining which network devices (e.g., switches) in the system 100 correspond to each of the signatures in, or associated with, the packet 310. In this regard, in a typical implementation, the validator 312 (at the packet destination, e.g., network host 102b) collaborates with the CSKA 108 (e.g., 108 in FIG. 1) to make these determinations.

In some implementations, the network 100 may store, for some period of time, data that represents the packet's path through the network 100 from source to destination as represented by the packet's signature string. This data may include, for example, the signature string itself. This data may be stored in computer-based memory in a variety of possible ways. For example, in some implementations, the data may be stored, along with similar data associated with other packets arriving at the same destination (network host 102b) in a computer-based memory that is local to the destination (network host 102b). In some implementations, the data may be stored, along with similar data associated with other packets arriving at all destinations in the network 100 in a common computer-based memory. More particularly, in such implementations, the data that represents the packet's path through the network 100 from source to destination as represented by the packet's signature string may be mirrored to a central repository which maintains these records. This repository can be constructed in a variety of ways including a distributed store providing for a more scalable solution than a single device or location. The signatures can be verified either in real-time as the packet traverses the network or arrives at the destination, or from historical storage of the packet keys and identifiers. The signature string may also optionally be stored within the packet contents itself and stripped before the packet reaches its final destination.

If the data representing a packet's path through the network 100 as represented by the packet's signature string is stored, and that packet ends up later causing problems, because it turned out to be in some way malicious, then a system administrator, for example, can review the stored data and relatively easily determine where that packet came from and which points in the network 100 the packet contacted. This sort of information can help the system administrator a great deal to identify and remedy any network vulnerabilities that may have enabled or otherwise allowed the malicious packet to access the network 100.

Moreover, in various implementations, the key materials (i.e., one or more pieces of data) used to generate the keys, and/or the keys themselves, can be changed at set intervals (e.g., every hour, two hours) or on demand. So, if a system administrator or intelligent computer network process, for example, notices a problem (e.g., the network has been compromised or some vulnerability has allowed one or more malicious packets to access the network 100), then that administrator or intelligent network process may cause an on demand reset of one or more (or all) of the keys in the system. In response to an on demand, or scheduled change, the CSKA 108 may take steps to initiate and cause the change.

What follows is a detailed explanation of parts of an exemplary process for packet signing and validation that might be performed by the network 100 in FIG. 1.

As mentioned above, when a packet arrives at its destination, the validator 312 checks the validity of that packet.

According to this exemplary process, there are two sets of parameters that the validator 312 utilizes in this regard to check packet validity. One set of parameters is pushed to the validator 312 from the CSKA 108, and one set of parameters is pulled from the CSKA 108 by the validator 312. In this regard, the validator requests (pulls) key set(s) from the CSKA 108 to validate any signatures that the signers may have attached to the packet. One part of each of these key sets is a key (previous version, and current version) of the signer that signed and sent the packet. In a typical implementation, each signer always has a current version of this key and a previous version of this key. The signers periodically request keys from the CSKA 108 and always maintain the last computed key(s). Both keys (current version and previous version) may be added to the key set to prevent race conditions. The key is helpful to validate the identity of the signer and also may facilitate denial-or service (DOS) attack protection.

The other key in this key set is a signing key generator that may be used by both the signer and the validator to determine (e.g., compute) the signing key. More particularly, the signing key may be used by the signer to determine (e.g., compute) the signature, and the signing key may be used by the validator to determine (e.g., compute) the expected signature of the packet for validation purposes.

In some implementations, the signer sends this complete key set (identifying keys and signing keys) for some number of packets of a session (e.g., the first three packets of a TCP or UDP session) and the signer also periodically rotates the key set for long running sessions. In some implementations, header information may be added to a packet to indicate, for example, whether or not a new key set has been provided. The term session should be interpreted broadly to include, for example, any communications paths (source IP, source port, destination IP, destination port, protocol—UDP or TCP), for example, through the network 100.

The CSKA 108 in this exemplary process also periodically pushes a shared key set (previous key, current key, next key) to every signer (e.g., switches 104a, 104b, 104c, 104d, 104e, and 104f in FIG. 1) and validator (e.g., 312) in the network 100. During each period of time, the CSKA 108 may change the key so that a new key becomes the next key, the next key becomes the current key, and the current key becomes the previous key. In some implementations, this may help prevent race conditions that otherwise might occur with timings of when a particular device receives a key set. The shared key may be used to compute a cryptographic signature, for example, a hash for the purposes of very quick DOS checking. In a typical implementation, only the collections of signers and validators will have this information so only these devices can talk to each other. All other rogue devices will be very quickly detected so as to not allow them to access a particular device or service.

According to this exemplary process, each signer (e.g., switch 104a, 104b, 104c, 104d, 104e, and 104f in FIG. 1) attaches a signature to each packet that passes through that signer.

In this regard, according to the exemplary process, every signer device (e.g., switches 104a, 104b, 104c, 104d, 104e, and 104f in FIG. 1) has its own signing key generator that can generate a signing key. Typically, the signing key generators are periodically rotated. Moreover, every communications session in the network 100 has a session identifier (that also may rotate, for example, during a long running session). In one exemplary implementation, the session identifier may be used along with the signer device's signing key generator to generate a current signing key for a session. Thus, in this exemplary implementation, every signer in every session will have its own unique signing key.

In this exemplary process, the signing key is hashed with the contents of one or more protocol layers in the packet, for example but not limited to, Open System Interconnection (OSI) layers in the packet to compute the signature. In various implementations, a signature can be associated with the immutable portions of a packet header and/or the immutable portions of any one or more of OSI layers 2 through 7—the data link layer, the network layer, the transport layer, the session layer, the presentation layer, and/or the application layer. Contents of packets using protocols not defined by the OSI model may also be signed. The way this occurs is that a signer pushes its signing key generator to the CSKA 108 (e.g., 108 in FIG. 1). In a typical implementation, only the signer and the CSKA 108 would be aware of this signing key generator. For every session, a network component (e.g., signer) creates a publicly visible session identifier and this session identifier may be passed through the signing key generator to create the actual signing key. In some implementations, the session identifier is passed in the key set mentioned above for the packets (one or more) that are used to represent the start of every session and may be rotated periodically in the session to effectively rotate the signing key used to compute the signature. Both the signer and CSKA 108 in this example know the generator so both the signer and CSKA 108 can compute the signing key. In some implementations, the CSKA 108 needs to be able to do this so that it can provide the key to the validator 312 when the validator 312 requests it. The CSKA 108 typically has logic in it to keep track of the validator 312 that requested a key for a given signer/session and the CSKA 108 will only allow that same validator 312 to request the key again. This may be desirable, for example, to help prevent validator spoofing/cloning.

Figure 4:
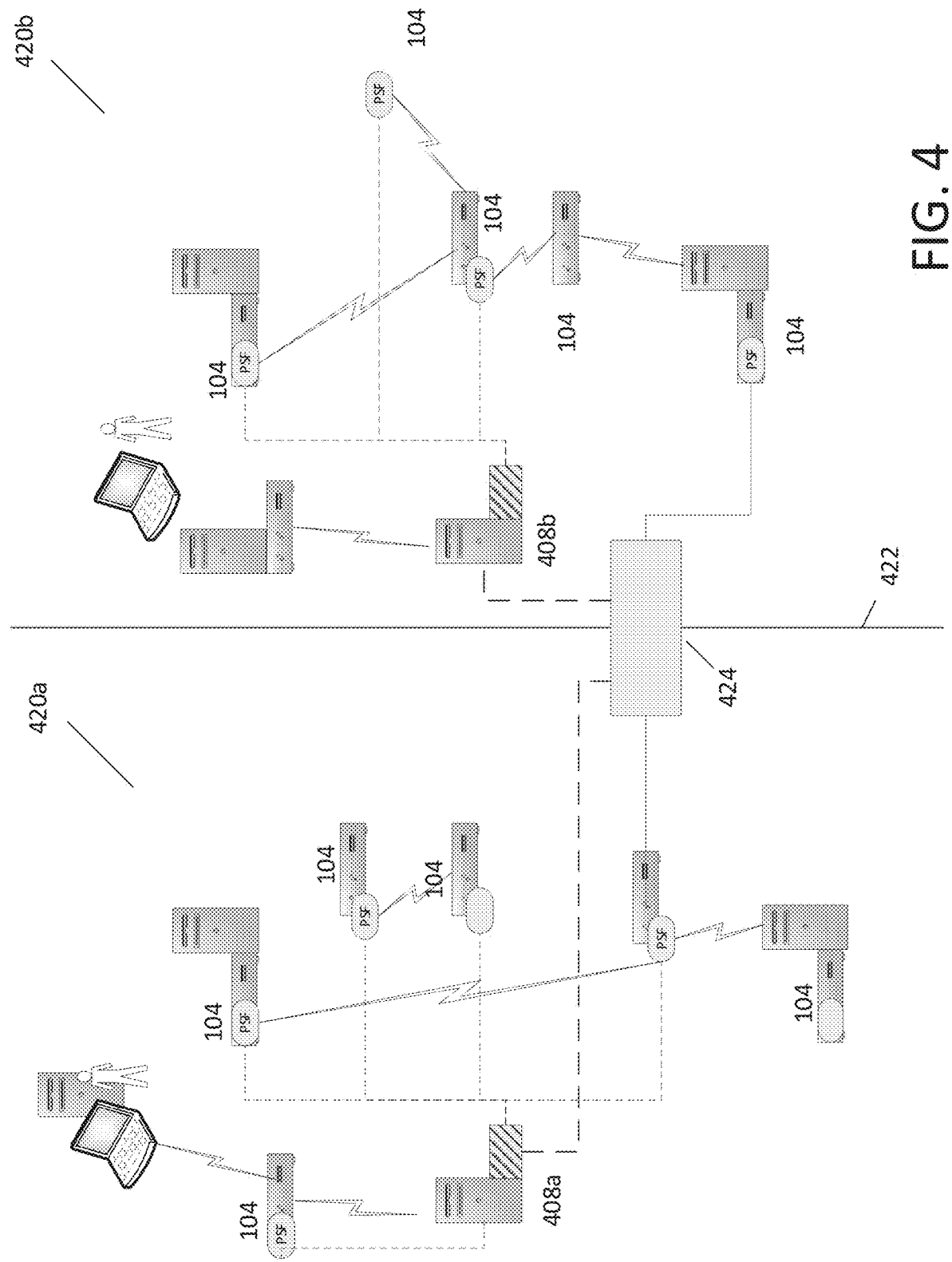
FIG. 4 shows one such example of this kind of cross-enterprise environment that includes two distinct networks.

The techniques and technologies disclosed herein can be used in a cross-enterprise environment. FIG. 4 shows one such example of this kind of cross-enterprise environment that includes two distinct networks 420a, and 420b. The line 422 provided in the illustrated figure demarcates the two distinct packet-switched networks 420a, and 420b (with switches 104, some of which, but not all, are PSF-enabled). In various implementations, the two distinct networks 420a, and 420b may be separated physically and from a network security perspective, with one or more firewalls, for example, monitoring and controlling incoming and outgoing network traffic in each of the distinct networks 420a, and 420b based on predetermined security rules, and establishing barriers to various communications.

Each distinct network 420a and 420b in the illustrated implementation has a plurality of network components that are similar to the network components discussed above in connection with FIG. 1. Notably, in the illustrated implementation, each distinct network 420a, 420b has its own CSKA 408a, 408b. Moreover, there is a peering connection 424 between the networks 420a, 420b that is configured to establish trust between the CSKAs 408a, 408b. This trust is used to allow for sharing of material. The peering connection 424 is a gateway that allows the two networks to communicate. The peering connection 424 validates a first signature of a message received from a first network, strips the first signature from the message and then provides a second signature for transmission to the second network. The header in a particular packet also may contain an identifier that identifies which CSKA 408a, 408b to request information from.

Source path validation in packet networks relies on the destination trusting the contents of the frames and packets received which are susceptible to modification by an y entity with access to the traffic in a prior segment. As a result, digital security response personnel and systems must review traffic logs consisting of hundreds of millions records with varying levels of detail to determine actual origin and validity. The disproportionate computational and analytical burden put on the responders provides attackers with significant advantage when attempting to evade detection.

The invention provides defenders details to determine the packet transmission path and transmission integrity between each set of peers. As such, the approach can be used to not only ensure that information received is valid, but to prevent and track the transmission/data transaction of data across defined boundaries—for instance, the refusal to route data across valid routable links based on packet origin for compliance reasons.

The invention specifies that a chain of transmission segments be created for each packet that traverses the network. This means that each packet traversing the network is identified by a key that is produced using a hashing function on the packet contents. For each switch, the network passes through, an identifier representing the switch along with other optional state information is added to the value associated with the packet key—thereby creating a chain of switch and state identifiers. This chain of identifiers provides a type of switch and state bread-crumbing for each packet. This invention can be applied to inter and intra network functions. This would then provide packet validation, even across network boundaries.

The packet key and chain of identifiers is mirrored to a central repository which maintains these records. This repository can be constructed in a variety of ways including a distributed store providing for a more scalable solution than a single device or location. The identifiers can be verified either in real-time as the packet traverses the network, or from historical storage of the packet keys and identifiers.

The chain of identifiers may also optionally be stored within the packet contents itself and stripped before the packet reaches its final destination. In this case the use of the repository is optional.

Figure 5:
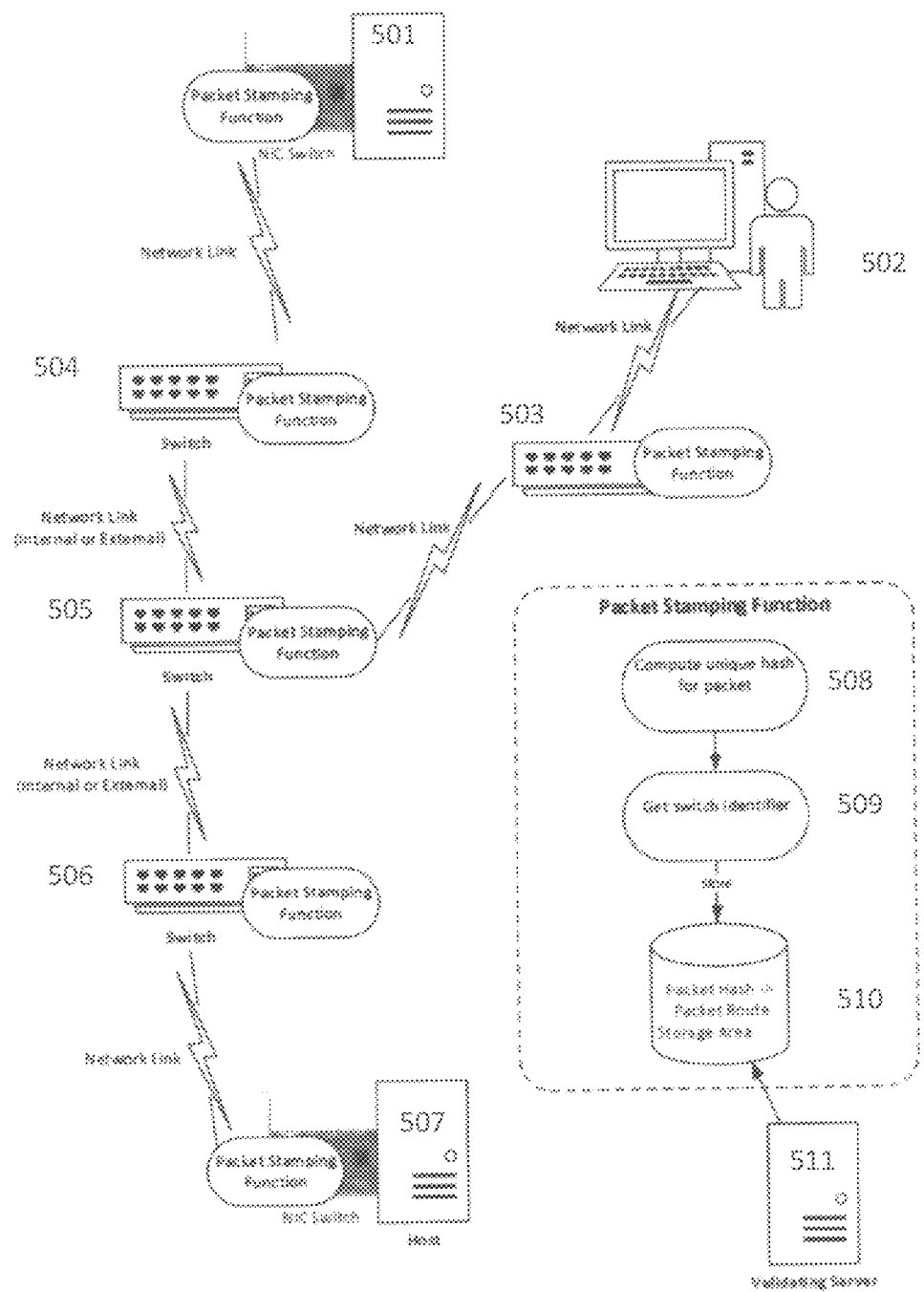
FIG. 5 is a schematic representation of an exemplary computer network and a process.

FIG. 5 shows a sender (either 501, 502, or 507) creating a network packet and sending into the network.

The following use-case will describe a scenario where the host at (501) sends a packet to the host at (507). The host at (501) creates a packet and before delivering to the network it passes the packet through a Packet Stamping Function (PSF). The PSF computes a unique packet key (PK) based on the packet contents using one of many well document techniques (508). It then gets an identifier (509) representing the switch and any relevant state information (SI) (SI can be data from the packet header, body, time, or any other information that would assist in maintaining the necessary state). The SI value maybe added to the packet contents and/or passed to a storage area (510). The storage area adds SI to any already stored SI values for the packet represented by the key PK. In this particular case, this is the first switch in the chain, so a new storage entry is added represented by PK and SI. The packet then moves to the next switch (504). The switch (504) also passes the packet through a PSF which appends another SI to the original packet represented in the storage area by PK The switch then passes through two more switches at (505) and (506). Both of these switches also pass the packet through a PSF appending two more SI values to the chain of SI values. Finally, the packet arrives at (507) and is sent through one final PSF.

Values added to the storage area at (510) can be validated as they are being inserted or a post processing validating server (511) may analyze the historic data.

Network and application performance can also be evaluated using the system. As part of the switch identifiers, a timestamp can be added to each identifier. Therefore, it is possible to determine the exact time that it takes a packet to traverse the network and for that packet to be processed.

Figure 6A:
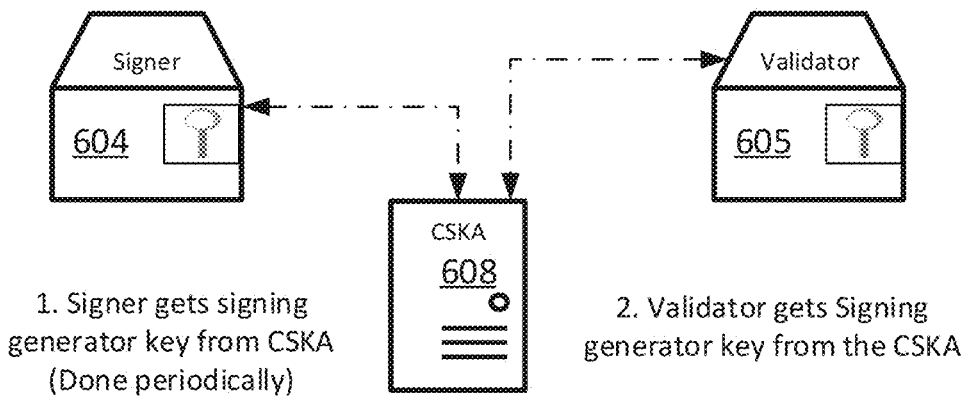
FIG. 6A is a schematic diagram of an exemplary embodiment of a system under the present invention illustrating key distribution via a control plane.
Figure 6B:
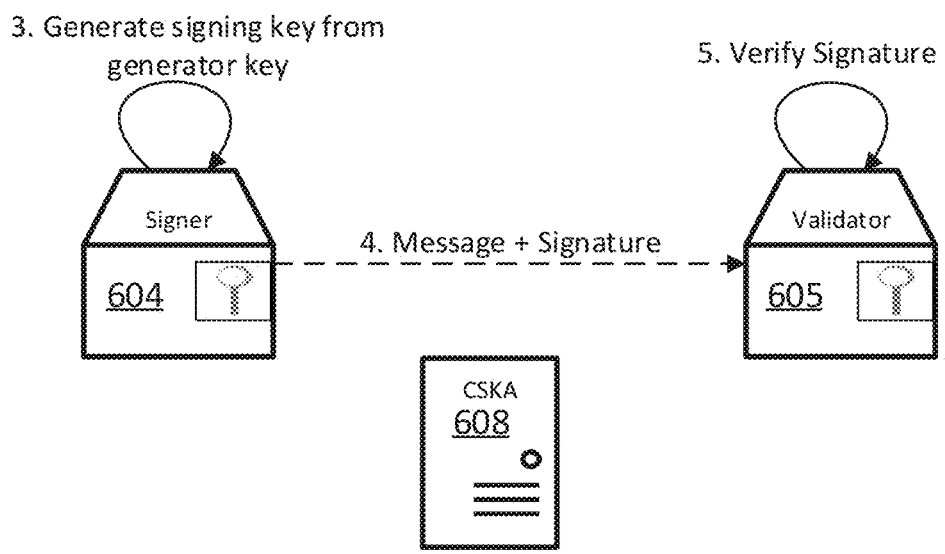
FIG. 6B is a schematic diagram of the system of FIG. 6A illustrating message transaction via a production plane.
Figure 6C:
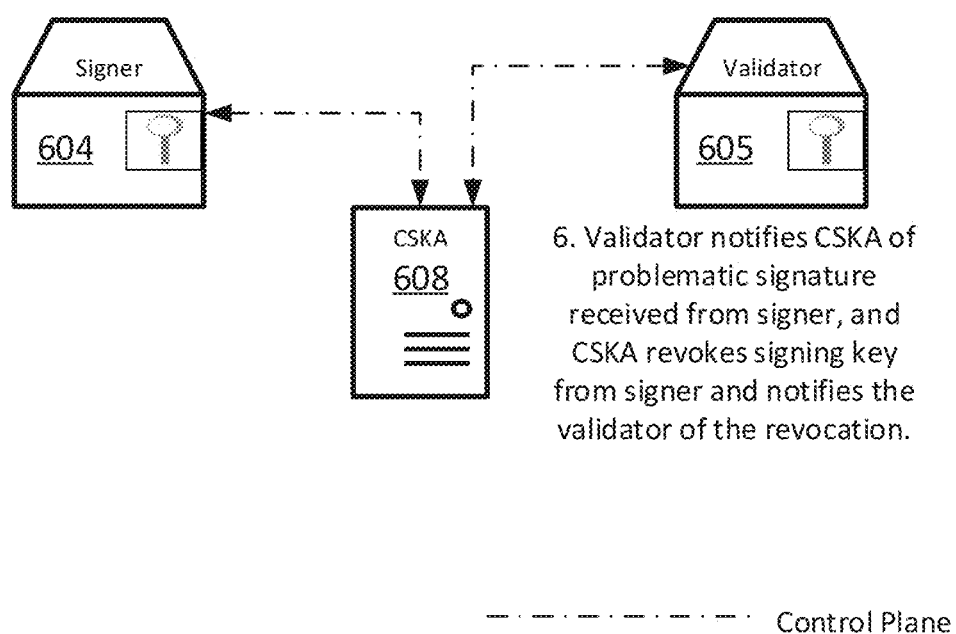
FIG. 6C is a schematic diagram of the system of FIG. 6A illustrating event transactions via the control plane.

It may be instructive to the understanding of the embodiments of the present invention to describe the system and its functionality in terms of separate functional planes of the system and their associated communication methodologies. In particular, the following detailed description of FIGS. 6A-6C is directed to the functionality of a control plane (including at least one CSKA 608, a plurality of signers 604, and a plurality of validators 605), and a production (or data) plane, which like the control plane includes the plurality of signers 604 and the plurality of validators 605, but does not include the CSKA 608. Collectively, the CSKA 608, the signer(s) 604 and the validator(s) 605 are referred to herein as a tri-parte construct operating across the control plane and the production plane defining a channel lock topology.

For simplicity, FIGS. 6A-6C only illustrate a single signer 604, a single validator 605, and a single CSKA 608. In various embodiments, there may be two or more CSKAs 608, which may be federated using industry standard secure protocols, for example, both intra-enterprise and inter-enterprise. Multiple CSKAs may operate either in the same logical domain of authorization/validation or spanning multiple via federation. An exemplary topology is a 3:logical domain for quorum and high availability. For purposes of the embodiments described here, the CSKA 608 may be thought of as having a service oriented architecture which may be implemented using a single instance of a CSKA 608.

The control plane communication channels are independent from the production plane communication channels. In general, the control plane provides bidirectional communication between each signer 604 and the CSKA 608, and between each validator 605 an the CSKA. As shown in FIG. 6A, the control plane is used to establish and maintain credentials ("keys") indicative of a trusted relationship between each signer 604, validator 605, and CSKA in the control plane. The credentials (keys) distributed via the control plane are used to validate uni-directional traffic (packets) in the production plane transmitted by the signer 604 and received by the validator 605, as shown by FIG. 6B.

A given network may have many signers 604 which each request keys from the CSKA 608. Similarly, the network may include many validators 605 which each request keys from the CSKA 608 based on packet transmissions received in the production plane or control plane contracts to preempt the key stores of signers 604 and validators 605 in a predetermined (control plane) communication path. Validators 605 may operate in serial passthrough or terminating capacities throughout the data path. For example, a network element such as a switch or router may operating in serial passthrough manner, where the network element functions a validator 605 to validate a received packet, and also as a signer, to sign the received packet before re-transmitting the packet to an end destination address (typically another network element configured as a validator 605). In a terminating capacity, the validator 605 validates the received packet, strips off the signature(s) provided by one or more signers 604, and passes the payload of the received packet to the end recipient of the packet.

As shown by FIG. 6A, the control plane manages the keys used to validate data being transmitted (by signers 604) and received (by validators 605) in the production plane. The CSKA 608 may be regarded as the source of truth for keys. The CSKA 608 provides a signing generator key to the signer 604, and provides the same signing generator key to the validator 605. All keys have an assigned lifetime (time to live (TTL)) of any arbitrary length, for example, selected by a network administrator. Once issued, keys may be invalidated, for example, as a result of a security event or other events, at which point the CSKA 608 notifies all key holders in the control plane of the revocation.

Events in the control plane include messages received, for example from a user of the system indicating a change in access rights, a heuristic threshold such as key requests over a period of time, or telemetry from adjacent systems such as network intrusion detection system (NIDS), host instruction detection system (HIDS), security information and event management (SIEM), anti-virus (AV), among others. For example, an event indicating a change in access rights may indicate that access rights previously granted to an employee or client have been revoked by a system administrator. The signer 604 and validator 605 can send events to the CSKA 608. The events are system defined, and typically include security events (breaches, detected attacks). The CSKA 608 receives an event and can look up the keys associated with the event in the key hash table and may then revoke the affected keys.

In general, the CSKA 608 may be a device in communication with a network, for example, a key server. The CSKA 608 is configured to act as a certificate authority used to create derivative mathematical relationships, keys for use in signatures in this case, in order to establish a chain of trust. For example, the CSKA 608 may be configured as a key oracle/key management interoperability protocol (KMIP) setup wherein request-specific material is returned in a query response without reversible mathematical relationship between data properties of the CSKA 108 and properties of the keys stored and/or distributed by the CSKA 608. Rather, the CSKA 108 is an associative store delivering elements to authorized clients (signers 604 and validators 605) on request via industry standard encrypted tunnels, for example transport layer security (TLS), NoiseSocket, etc.

The tri-parte construct defining the channel lock topology is responsible for key generation, key storage, key distribution, and key retrieval, among other functions. The CSKA 608 provides symmetrical key generation with an encoded time to live (TTL). The TTL functionality may be managed in the control plane or the data plane.

The CSKA 608 may generate a new key, for example but not limited to via a request to a pseudorandom number generator (PRNG) for a suitable number of bits, so there is no interrelated mathematical process between keys and generators or other keys. The PRNG may be implemented in hardware or software. Current keys and a set of additional keys are stored in the CSKA 608 with delivered copies also stored in the signer 604 and validator 605.

To receive and/or retrieve a key, both the signer 604 and the validator 605 may request keys from the CSKA 608, for example, using authenticated and encrypted protocols known by persons having skill in the art, for example, shared keys or transport layer security (TLS). Only the CSKA 608 can produce valid new keys. Signers 604 can "generate the right number of bits" for a faux key, but since such a faux key is not stored, distributed, and considered valid by the CSKA 608, the faux key can never be validated. If a faux key is detected in the network, for example, as received by a validator 605 via the production plane, the validator 605 may report receipt of the faux key to the CSKA 608 via the control plane as an event.

The CSKA 608 may provide additional services via the control plane, for example, providing an authorization tables defining access permissions to keys for access by signers 604 and validators 605, providing an authorization table defining permissible communication paths akin to security groups or firewall rules, predicated on the identities of signers 604 and validators 605 instead of their network address attributes. The CSKA 608 may also provide signing and validation rules for the defined production plane communication paths, for example specifying which OSI layers in transmitted production plane packets should be signed and which should be validated to permit the system to work across routing. For example, this may include a change of OSI L2 elements in the header, a NAT (change of OSI L3 elements of the header), and/or socket proxies (SOCKS) (data-segment-only validation). The distribution of keys may be gated based upon one or more of these constraint sets. The CSKA 608 may also distribute signing and/or validation directives to clients (signers 604 and validators 605) via the control plane.

The CSKA 608 manages a tri-parte-contract enrollment process where signers 604 and validators 605 may be authorized to communicate via the control plane. For example, a client (signer 604 or validator 605) joining the tri-parte topology control plane must establish an encrypted communication channel with the CSKA 608 and prove its identity in order to receive keys and directives over the channel. As an enrollment example, the client may connect with the CSKA 608 via TLS1.3 using a unique client certificate signed by a common certificate authority (CA) as a server certificate of the CSKA 608 with full peer validation on both sides. Other authorization techniques familiar to persons having skill in the art may also be used, for example, but not limited to by the client passing the CSKA 608 a unique ID/one-time-key over an established channel, for example a persistent encrypted channel with the CSKA control plane using an industry accepted security protocol such as TLS1.3 with AES-GCM or NoiseSocket.

The keys are not mathematically associated with each other in any way, and are maintained in an associative store within the CSKA 608. For example, when the CSKA 608 issues a key, the CSKA 608 may place the key in a hash table, where the CSKA 608 may subsequently access the key via its key index.

Once a key has been generated and distributed, the CSKA 608 may renew a key in one of several scenarios, for example, if the time to life (TTL) of the key expires. A validator 605 will not accept a received packet after the TTL of the key used in the received packet signature 720 (FIG. 7) has expired. A signer 604 may request a new key from the CSKA 608 when the TTL of its previous key expires. For example, the CSKA 608 may provide the TTL information to the signer 604 as key metadata when the key is issued. Alternatively, the CSKA 608 may notify the signer 604 when the key is about to expire. The CSKA 608 assigns a TTL to the key when the key is generated, and the CSKA keeps a record of the key expiration. Once a key has been generated and distributed, it may be revoked by the CSKA 608, the signer 604, the validator 605, or via system events to the CSKA 608 as discussed further below, such as detection of a security breach.

An event is a type of control plane message exchanged by members of the tri-parte contract. For example, as shown by FIG. 6C, the validator 605 detects a problem with a signature 720 (FIG. 7) in a packet received from the signer via the production plane and reports the problem to the CSKA 608 via the control plane. The CSKA revokes the signing key from the signer 604 and, via a control plane event message, notifies the validator 605 of the revocation.

In another scenario, a host intrusion detection system running on an enrolled signer 604 or validator 605 may detect an attack and send an event message via the control plane to the CSKA 608, whereupon the CSKA may revoke the key of the vulnerable machine, for example, by notifying validators 605 of the revocation through the persistent encrypted channel with the CSKA 608 via the control plane.

Once enrolled in the tri-parte-contract via the control plane, signers 604 may unidirectionally transmit packets to validators 605 via the production plane. Specifically, a signer 604 may generate a packet, sign the packet using its authorized key, and transmit the packet. Upon receiving the packet, the validator 605 inspects the packet signature 720 (FIG. 7A) and, if necessary, communicates with the CSKA 608 to procure the signer key to validate the packet.

Figure 7A:
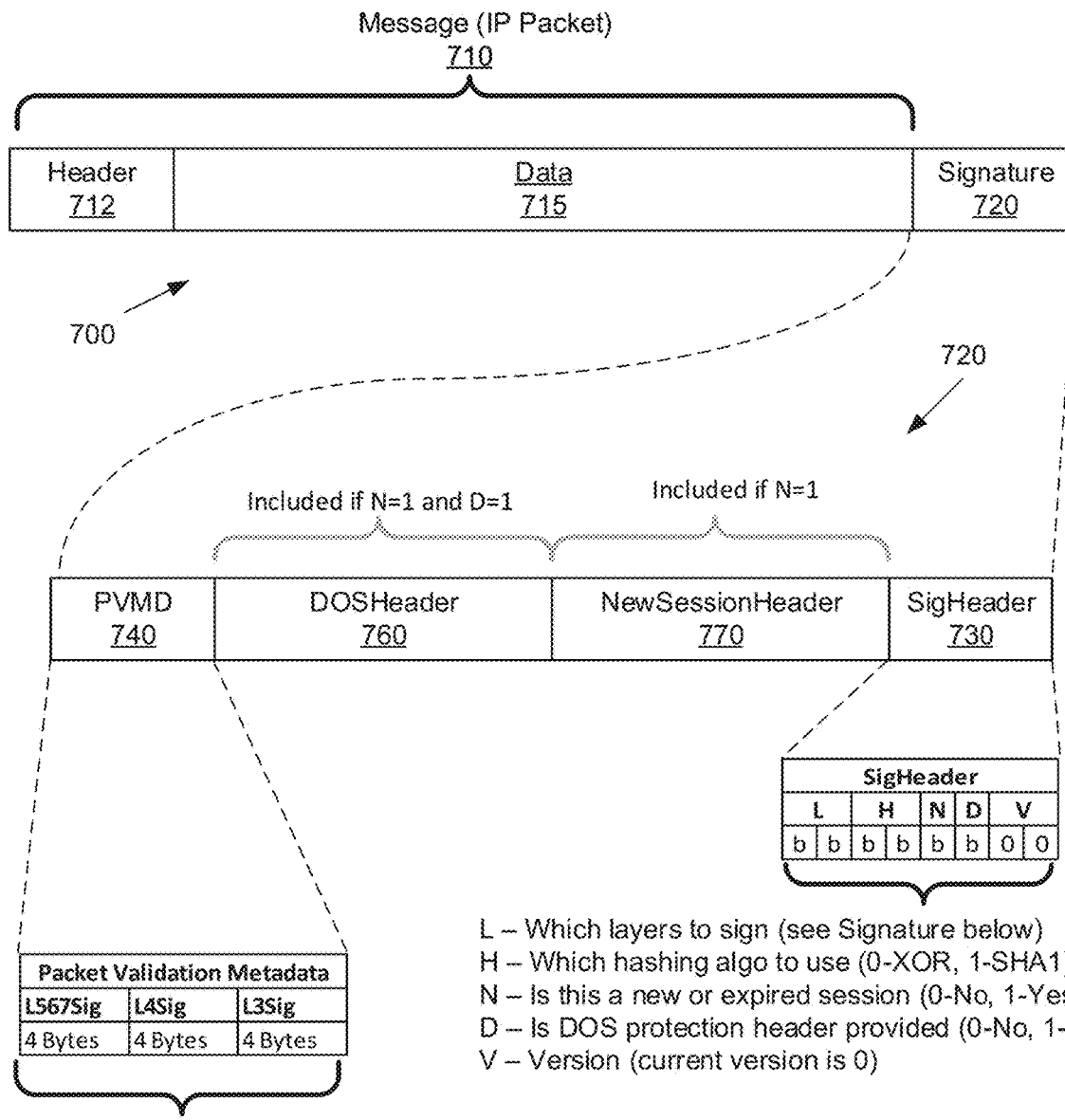
FIG. 7A is a schematic drawing of a message packet with attached signature according to an exemplary embodiment of the invention.

A signer 604 is typically a network element such a switch or router, although more generally, any device sending data over the production plane in block/packet semantic may be regarded a signer 604, for example, but not limited to an internet of things (IoT) device, medical devices, phones, and other devices having an IP stack or other non-serial communication bus. As described below in further detail, prior to transmission the signer 604 inserts a signature 720 (FIG. 7) into the packet. For example, the signer 604 appends the signature 720 (FIG. 7A) to the end (tail) of the packet 710 (FIG. 7A), and only modifies a header of the packet to account for the size of the signature 720 (FIG. 7A). For example, if the signature 720 (FIG. 7A) is sixteen bytes long, the signer increments the packet header length field (segment size) by sixteen. At the receiving side (typically the final destination of the message) the signature 720 (FIG. 7A) is stripped off by the validator 605, so the process is entirely transparent to the application receiving the packet. The signature 720 (FIG. 7A) generally may include hashes of the contents of one or more OSI layer encoded with a signer key, as described further below.

Like a signer 604, a validator 605 is typically a network element such a switch or router, although more generally, any device sending data over the production plane in block/packet semantic may be regarded a validator 605, for example, but not limited to an internet of things (IoT) device, medical devices, phones, and other devices having an IP stack or other non-serial communication bus.

Figure 8:
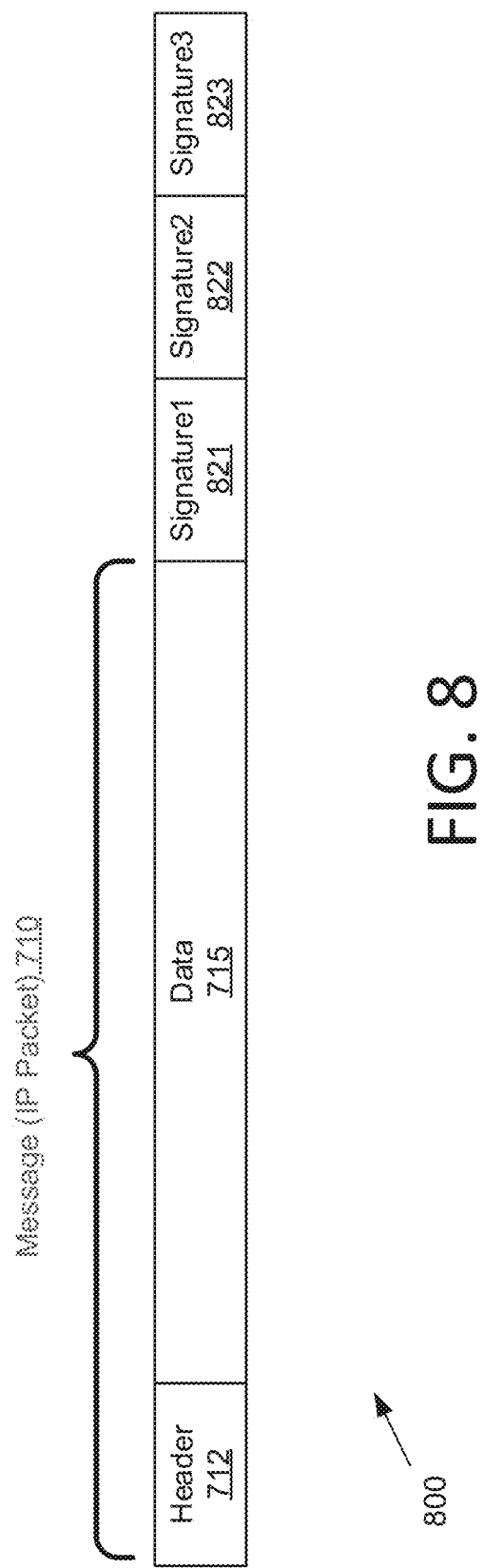
FIG. 8 is a schematic drawing of a message packet with three attached signatures according to an exemplary embodiment of the invention.

The validator 605 receives a packet and locates the signature field 720 (FIG. 7A), typically at the packet tail. Note that while under the embodiments a packet may include more than one signature 720 (FIG. 7A) added by a plurality of signers 604 in multiple hops before reaching the validator 605 as shown by FIG. 8, for simplicity the following describes the validator 605 receiving a packet having a single signature 720 (FIG. 7A).

Once keys have been distributed, the validator 605 can receive traffic (message and signature 720 (FIG. 7A)) from the signer 604 for the designated lifetime of the key (or until the CSKA 608 revokes the key). The designated lifetime of the key is defined at the time of key generation, and may range from, for example, a few seconds to indefinitely long, according to the needs of the system administrator. For example, in a relatively remote/secure IoT network, the designated lifetime may be months or years. Alternatively, the keys may be updated every few seconds, which may be desirable, for example in a less secure network.

The validator 605 may receive packets based on the signature 720 (FIG. 7A) inserted in the packet before the contents of the packet (other than the signature 720 (FIG. 7A)) are even opened. Therefore, once the signer 604 and validator 605 have the cryptographic keys, the communication link from the signer 604 and the validator 605 becomes essentially a locked channel. The validator 605 discards a packet with an improper signature 720 (FIG. 7A) before any subsequent processing may occur.

Under the first embodiment, the validator first applies the signer key to decrypt the signer key carried in the signature 720 (FIG. 7A). The validator 605 may apply symmetrical decryption techniques, of which there are many variations from simple XOR to NIST-approved ciphers for DoD/USG use. The validator the proceeds to verify the hash of the one or more OSI layers. The use of hashes, which is the folding of data bits, greatly increases the likelihood of detecting a change of the packet payload by a third party. Such hash functions have been commonly used for this purpose for decades.

Once the validator 605 has validated the signature 720 (FIG. 7A), the validator 605 strips the signatures 720 (FIG. 7A) before handing the packet "up" to the operating system (OS) of the receiving devices and the receiving application for subsequent processing. Therefore, handling of the packet signature 720 (FIG. 7A) does not impose a processing burden upon the OS and application. While the validator 605 may store the signature 720 (FIG. 7A) for auditing purposes the validator 605 is not required to do so for operation of the communication topology under normal conditions.

The communication in the production plane between the signer 604 and the validator 605 is unidirectional, typically using a unidirectional communication protocol such as internet protocol (IP), although other communication protocols may be used. This unidirectional aspect applies to the process of validating and signing. No acknowledgement or response from the receiver (validator 605) to the sender (signer 604) is required to continue sending & receiving messages. While the traffic generating/receiving applications and messaging may be bidirectional and have their own protocol under the exemplary embodiments the production plane communication leverages OSI attributes but operates somewhat independently of it to gain the operational advantage of validating packets without the need for bidirectional messaging. Other examples of unidirectional protocols that may be used by the production plane include protocols specific to IoT devices, medical device transmission, high latency/buffered transmissions, and industrial monitoring of lightweight devices, among others. Further, the production plane may be implemented on internal data buses using block/packet semantics of hardware components or software elements such as applications or application containers.

FIG. 7A is a schematic drawing of a message 700 with attached signature 720 according to an exemplary embodiment of the invention. It should be noted that while FIG. 7A depicts the message 710 as an IP packet having a header 712 and data field 715, alternative embodiments may use other message protocols. It should be further noted that while FIG. 7A shows the signature 720 at the tail of the message 700, in alternative embodiments the signature 720 may be inserted elsewhere in the packet 710.

The exemplary signature 720 may be divided into two or more fields. The signature 720 in the embodiment shown in FIG. 7A includes a packet validation metadata (PVMD) field 740, a denial of service (DoS) header 760, a new session header 770, and a SigHeader 730. In alternative embodiments the signature 720 may have more or fewer fields.

The SigHeader 730 may be thought of as a roadmap for the rest of the signature 720. Under the embodiment shown by FIG. 7A, the SigHeader 730 includes a two bit layer field L indicating which OSI layers to sign, a two bit hash ID field H indicating the hashing algorithm used in the PVMD field, a new flag N indicating if the present session has expired (and thereby indicating whether the NewSessionHeader 770 is present in the signature 720), a DoS flag indicating if the DOSHeader 760 is present in the signature 720, and a two bit version field.

The PMVD 740 includes OSI layer signature hashes (SigHash) of OSI layers in the data field 715 as indicated by the L and H fields of the SigHeader 730. The mapping of SigHashes is shown by Table 1.

TABLE 1

| Mapping of Packet Validation Metadata Field | |
|---|---|
| L | SigHash(s) to include |
| 3 | L567Sig |
| 2 | L567Sig, L4Sig |
| 1 | L567Sig, L4Sig, and L3Sig |
| 0 | Future (L2 signing) |

Each OSI layer signature is a hash of Hash(SigHash|Payload), where Lxxx indicates the OSI layer numbers included in the hash. Here the hash algorithm is chosen based on the H field, SigHash is folded to 4 bytes of SHA1Hash(Id-Hash|Sk) where Sk is the signer key. Since the signer 604 knows the Sk, the signer 604 can generate SigHash directly. The validator 605 may obtain the SigHash by querying the CSKA 608 via the control plane. It should be noted that any/all OSI layers may be signed except OSI layer 1, which is hardware and is not preemptable. In this manner, the signature 720 penetrates the OSI layers, so that a hacker cannot hide undetected within an OSI layer. Specifically, the signer 604 computes various fields of the signature 720 (hashed layer signatures, sub-headers, etc.), and uses the signer key to encode into the signature 720. Upon receipt of the packet, the validator 605 first uses the signer key to decode the signature 720 to access the underlying signature fields.

Figure 7B:
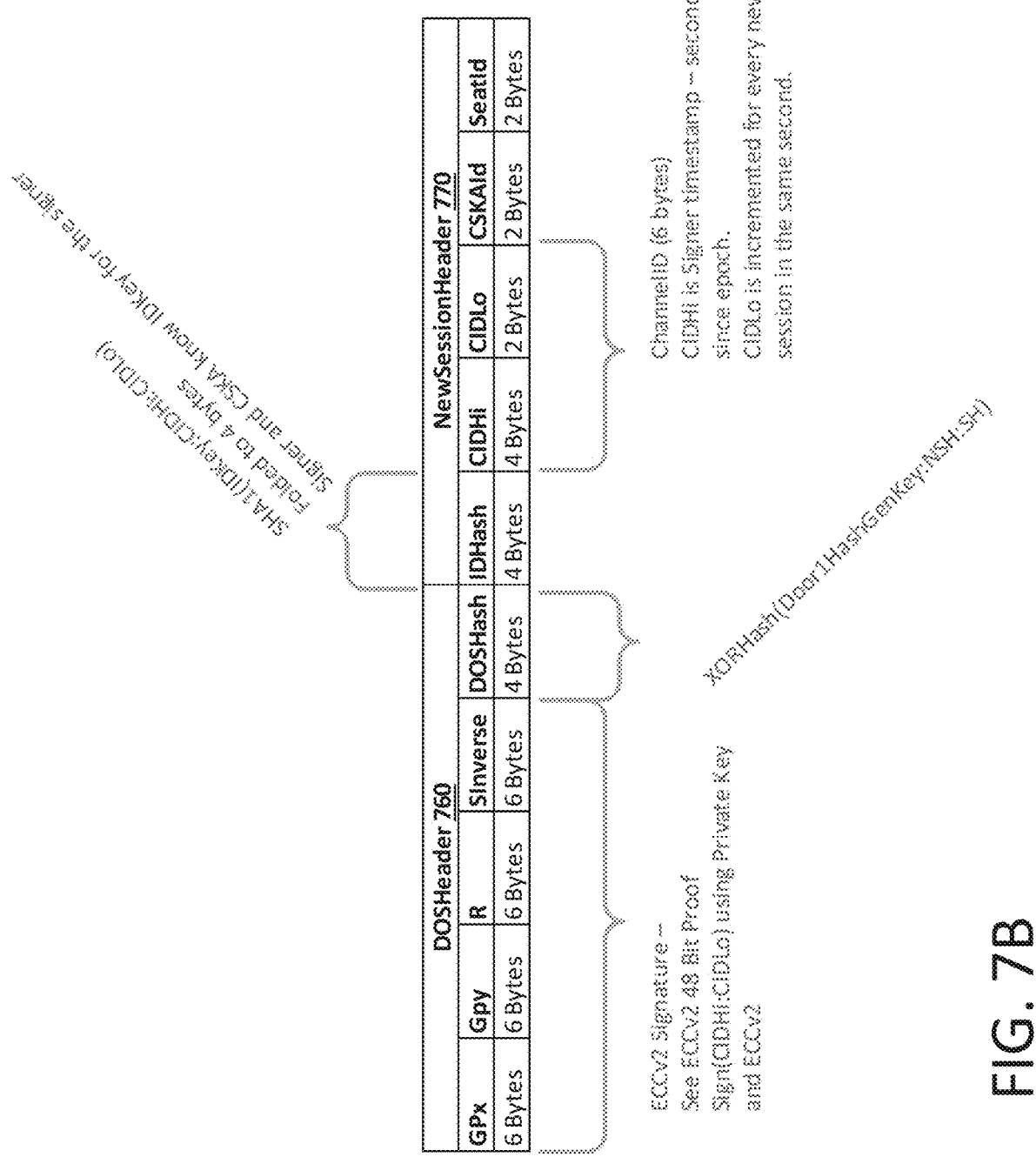
FIG. 7B is a schematic drawing showing a detail of two fields of the signature of FIG. 7A.

FIG. 7B maps out the optional DOSHeader 760 and NewSessionHeader 770 fields of the signature 720. The NewSessionHeader 770 indicates the validator 605 should do a lookup for efficiency, and the DOSHeader 760 serves prevent denial of service attacks against the system by way of flooding it with invalid requests. It should be noted that while FIGS. 7A-B show one exemplary signature format, alternative embodiments may employ different signature formats.

FIG. 8 is a schematic drawing of a message 800 with a plurality of signatures 821, 822, 823 inserted by a plurality of signers 604. Each signer 604 only signs once. Multiple signatures are the result of a message data paths consisting of multiple hops including a corresponding number of signers 604. A validator 605 receiving a message 800 with a plurality of signatures 821, 822, 823 sequentially strips off the endmost signature of the stack of signatures 821, 822, 823.

In alternative embodiments, a signer 604 at an intermediate hop may be channel lock aware and may be configured to perform inline stripping of previously applied signatures and append its own signature. In another alternative embodiment a signer 604 at an intermediate hop may act as a pass-through with no write into the data buffer, either validating or not acting on the previous signature 821, 822, 823. Signatures may be appended by signers in unrelated topologies which have no access to each other's CSKAs or knowledge that the packet was even signed before. Related signers technically also do not need to access the prior signers key unless they are also performing validation of the packet across the last leg of transport.

Under a preferable embodiment, signature insertion/validation adds on the order of 10 microseconds or less, well within typical packet delivery latency tolerances. The embodiments may detect fraud without having to open the payload of the received packet. Specifically, the validator 605 is able to detect corruption of and/or tampering with the packet payload without opening the payload. The validator 605 does this by (first) validating the signer key, and (second) checking a hashing of the payload. As a reminder, only enrolled signers/validators have access to the key provided by the CSKA 608.

A number of embodiments of the invention have been described. Nevertheless, it will be understood that various modifications may be made without departing from the spirit and scope of the invention.

For example, the network 100, or networks, can include any number of network components (e.g., hosts, servers, routers, switches, etc.) arranged in any kind of way. The switches may be stand-alone components or may be associated with other components (e.g., attached to and/or configured to enable a component to communicate over a packet-switched network). In general terms, a network switch may be considered a computer networking device that connects devices together on a computer network for example by using packet switching, to receive, process, and forward data to a destination device.

The network may include a variety of network hosts, and other network components, in general terms, a network host is a computer or other device connected to, or forming part of, a computer network. A network host may offer information resources, services, and applications to users or other nodes on the network.

A variety of other types of network components (e.g., hosts, bridges, routers, gateways, etc.) may be configured to apply signatures to a packet traversing the network.

A particular network can be configured so that a large number of network components (e.g., switches or the like) in the network attach, or otherwise associate, a signature to the passing packets, or so that only very few network components in the network attach, or otherwise associate, a signature to the passing packets. In general, adding more components that sign a packet, for example, will increase the granularity with which the network can trace a packet's path through the network.

In various implementations, the techniques and technologies disclosed herein can be applied to block and/or minimize the negative effects of malware and the like. In general, malware, short for malicious software, is an umbrella term used to refer to a variety of forms of hostile or intrusive software, including, for example, computer viruses, worms, Trojan horses, ransomware, spyware, adware, scareware, etc. It can take the form of executable code, scripts, active content, other software, etc. Malware is defined by its malicious intent, acting against the requirements of the computer user—and so generally does not include software that causes unintentional harm due to some deficiency. The techniques and technologies disclosed herein would be effective against blocking and/or minimizing unintentional harm due to deficiencies as well.

In some implementations, network and application performance can also be evaluated using the system. As part of the switch identifiers, a timestamp can be added to each identifier. Therefore, it is possible to determine the exact time that it takes a packet to traverse the network and for that packet to be processed.

In various implementations, a network may have one central validator, or many different validators. In some implementations, every destination in the network may have its own validator.

The signatures are generally digital signatures and can take any one of many different forms.

As disclosed herein, the switches, for example, attach the signatures to the packets. A signature, therefore, can be associated with a packet in a variety of ways, even if it is not necessarily attached to the packet. In this regard, the signature from each switch may, at least theoretically, be made available (e.g., at the packet's intended destination) without necessarily having traveled with the packet. So, a destination may receive a packet and its signature(s) or signature string at separate points in time. As long as the validator has enough information in the packet and the signature(s)/string of signatures to relate the two, then the two are sufficiently associated.

In various embodiments, the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

At least some of the operations described in this specification can be implemented as operations performed by a data processing apparatus (e.g., a processor) on data stored on one or more computer-readable storage devices or received from other sources. The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings and described herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, some of the concepts disclosed herein may take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

Other implementations are within the scope of the claims.

What is claimed is:

1. A validation device of a data validation system in a communication network comprising a bidirectional control plane, and a bidirectional and/or uni-directional message production plane, the data validation system further comprising a message sending device at a first network location, a message receiving device at a second network location in the production plane, a signer device configured to communicate control information bidirectionally via the control plane and access message data via the production plane, and a network key manager configured to convey first key data uniquely associated with the signer device via the control plane, wherein the control plane is independent from the production plane, the validation device comprising:
   a processor and a memory configured to store non-transitory instructions that, when executed by the processor, perform the steps of:
     communicating control information bidirectionally via the control plane and access message data via the production plane;
     receiving the first key data via the control plane;
     accessing a message received at the message receiving device from the message sending device via the production plane, wherein the message comprises message data and a signature comprising the first key data; and
     using the first key data to check a validity of the signature.

2. The validation device of claim 1, wherein the validation device is further configured not to validate the signature comprising an expired a time to live.

3. The validation device of claim 1, wherein the validation device is further configured to check the validity of the signature at or near the second network location.

4. The validation device of claim 3, wherein the check of the validity of the signature further comprises collaborating with the network key manager via the control plane.

5. The validation device of claim 1, wherein:
   the signature further comprises a cryptographic signature of the message data; and
   the validation device is further configured to:
     re-calculate the cryptographic signature of the message data;
     compare a recalculated cryptographic signature to the signature cryptographic signature; and
     invalidate the signature if the recalculated cryptographic signature does not match the signature cryptographic signature.

6. The validation device of claim 5, further comprising the step of:
   discarding a message of the invalidated signature before the message is received by the message receiving device.

7. A network key manager device for a data validation system in a communication network comprising a bidirectional control plane, and a bidirectional and/or uni-directional message production plane, the data validation system further comprising a message sending device at a first network location and a message receiving device at a second network location in the production plane, wherein the control plane is independent from the production plane, the system further comprising a signer device configured to communicate control information bidirectionally via the control plane and access message data via the production plane, and a validation device configured to communicate control information bidirectionally via the control plane and access message data via the production plane, they network key manager comprising:
   a processor and a memory configured to store non-transitory instructions that, when executed by the processor, perform the step of conveying first key data uniquely associated with the signer device to the signer device and the validation device via the control plane.

8. The network key manager device of claim 7, wherein the network key manager is further configured to convey via the control plane to the validation device and an intermediate device configured to communicate via the control plane and the production plane second key data uniquely associated with the intermediate device.

9. The system of claim 7, wherein the key manager is further configured to change key material used to generate and/or validate the signature at set time intervals.

10. A signer device of a data validation system in a communication network comprising a bidirectional control plane and a bidirectional and/or uni-directional message production plane, the data validation system further comprising a message sending device at a first network location, a message receiving device at a second network location in the production plane, and a network key manager configured to convey first key data uniquely associated with the signer device via the control plane, wherein the control plane is independent from the production plane, the signer device comprising:
   a processor and a memory configured to store non-transitory instructions that, when executed by the processor, perform the steps of:
   communicating control information bidirectionally via the control plane;
   receiving the first key data via the control plane;
   accessing via the production plane a message from the message sending device comprising message data for transmission via the production plane,
   producing using the first key data a signature associated with and unique to the signer device; and
   attaching the signature to the message.

11. The signer device of claim 10 wherein the signature further comprises a cryptographic signature of the message data.

12. The signer device of claim 11, wherein the cryptographic signature comprises a hash of the message data.

* * * * *